Nov. 5, 1940.  O. F. CARLSON  2,220,144
FLUID RESPONSIVE DEVICE
Filed Sept. 11, 1937  2 Sheets-Sheet 1
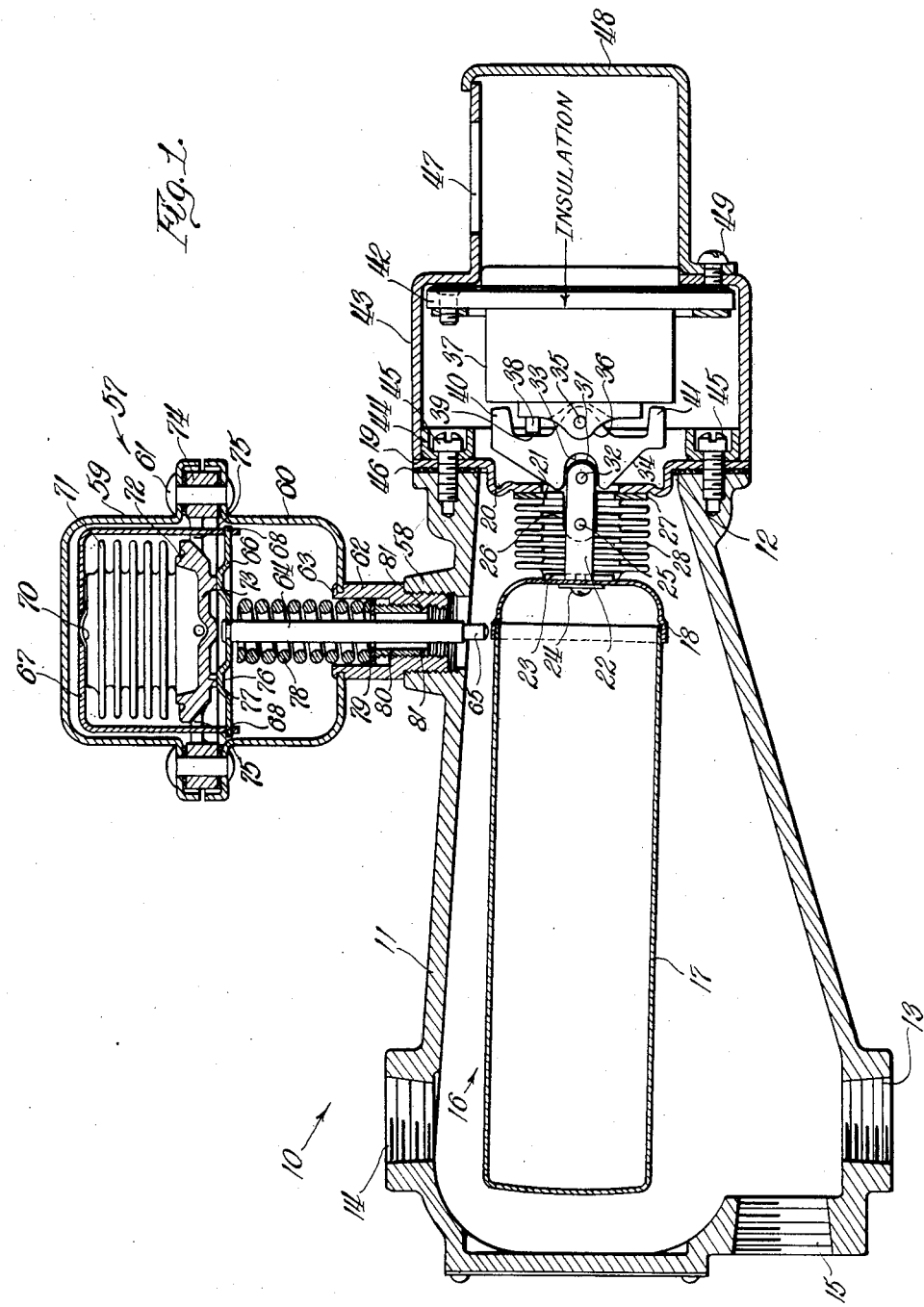
Inventor
Oscar F. Carlson
By [signature]
Attys Nov. 5, 1940.   O. F. CARLSON   2,220,144
FLUID RESPONSIVE DEVICE
Filed Sept. 11, 1937   2 Sheets-Sheet 2
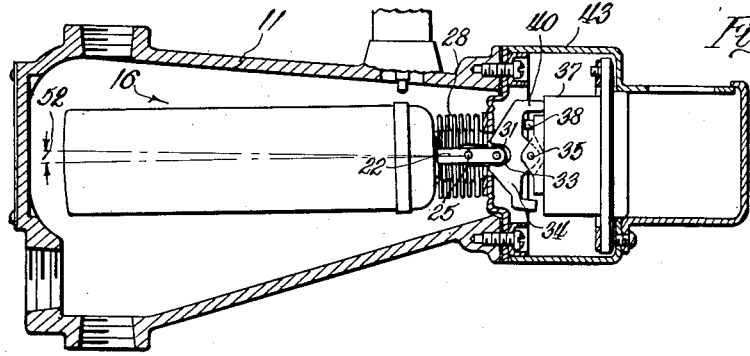
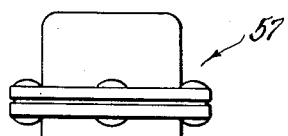
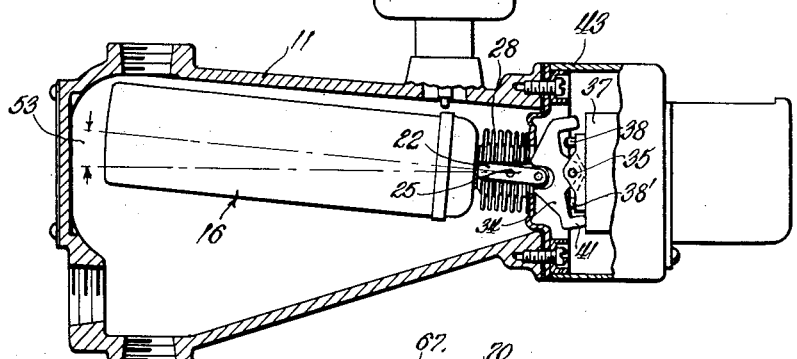
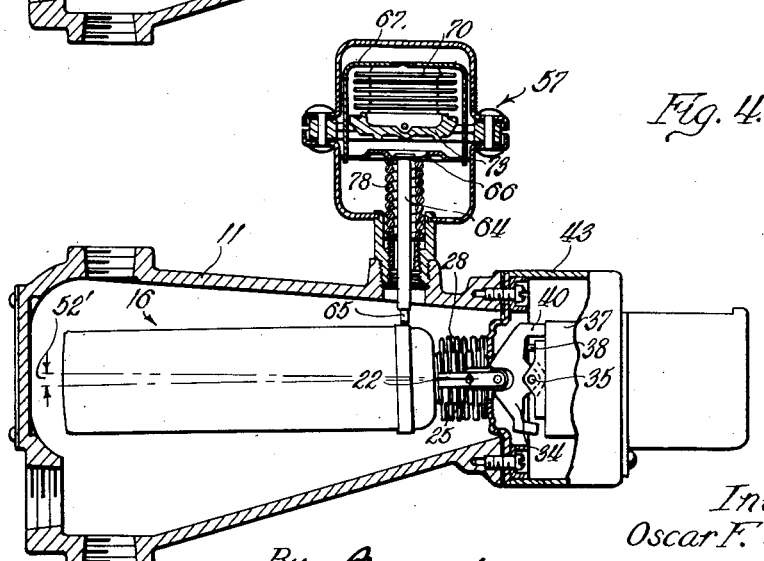
Inventor
Oscar F. Carlson
By Mowjakson Bortucke Drewer
Att'ys Patented Nov. 5, 1940

2,220,144

UNITED STATES PATENT OFFICE 2,220,144

FLUID RESPONSIVE DEVICE

Oscar F. Carlson, Kenilworth, Ill., assignor of one-half to Oscar F. Carlson Company, Chicago, Ill., a corporation of Illinois, and one-half to Everett N. McDonnell, Chicago, Ill.

Application September 11, 1937, Serial No. 163,433

12 Claims. (Cl. 200—84)

My invention relates, generally, to control devices for steam boilers and it has particular relation to devices responsive to change in water level and pressure in such boilers.

The object of my invention, generally stated, is to provide a liquid level and pressure responsive device that shall be simple and efficient in operation and which may be readily and economically manufactured and installed.

An important object of my invention is to provide for operating a control device from one position to another in response to a slight change in the position of a float caused either by change in liquid level or pressure in a boiler.

Another object of my invention is to flexibly seal a float in a float chamber and at the same time rockably mount the float about a fixed axis with the mounting means out of contact with the contents of the float chamber.

Still another object of my invention is to operate the float of a liquid level responsive device in response to the occurrence of a predetermined pressure in the same direction that it is operated by change in liquid level to effect the operation of a control device from one position to another as the result of either a change in level or a change in pressure.

A further object of my invention is to provide for adjusting the pressure at which the pressure responsive device will be rendered operative for effecting its control function.

Other objects of my invention will, in part, be obvious and in part appear hereinafter.

My invention, accordingly, is disclosed in the embodiment thereof shown in the accompanying drawings and comprises the features of construction, combination of elements, and arrangement of parts which will be exemplified in the construction hereinafter set forth, and the scope of the application of which will be indicated in the appended claims.

For a more complete understanding of the nature and scope of my invention, reference may be had to the following detailed description, taken in connection with the accompanying drawings, in which:

Figure 1 is a cross sectional view of a liquid level and pressure responsive device organized in accordance with my invention;

Figure 2 illustrates the position to which the float and control device are operated on lowering of the liquid level;

Figure 3 shows the position to which the float may be operated on raising of the liquid level in the float chamber; and Figure 4 illustrates the position to which the float and the control apparatus may be operated on the occurrence of a predetermined pressure in the float chamber.

Referring now particularly to Figure 1 of the drawings, it will be observed that the reference character 10 designates, generally, a liquid level and pressure responsive device which includes a float chamber 11 that is generally tubular in shape. The right-hand end of the float chamber 11 is open, as indicated at 12, while the left-hand end is substantially closed. A threaded opening 13 is provided at the lowermost point in the float chamber 11 for receiving a drain valve. Boiler ports 14 and 15 are also provided, as illustrated, to permit connections to a steam boiler, as will be readily understood.

Inside of the float chamber 11 a float, shown generally at 16, is provided and it is arranged to move up and down rockably in accordance with changes in pressure or in the level of the liquid in the float chamber 11 which correspond to changes in the level of the liquid in the boiler. The float 16 is generally tubular in shape and comprises a sleeve 17 that is closed at one end and at the other end is closed by a cap 18. It will be noted that the diameter of the float 16 is small as compared to its length. The provision of a float of these general dimensions in a float chamber of generally tubular shape provides a very compact arrangement of liquid level responsive device that has been found to be quite efficient in operation.

With a view to mounting the float 16 rockably and at the same time to close the open end 12 of the float chamber 11, an end plate 19 is provided. The end plate 19 is provided with an inwardly projecting portion 20 having a centrally located aperture 21 therein. A pair of arms 22, integrally formed with a base member 23 project through the aperture 21 and are secured to the cap 18 of the float 16 by any suitable means, such as by the screw 24. The arms 22 are rockably mounted by means of a pin 25 which extends through the upstanding ears 26 of a support member 27 that is carried by the inwardly projecting portion 20 of the plate 19. The support member 27 may be secured in position on the inwardly projecting portion 20 by any suitable means, such as by soldering.

It will now be observed that the float 16 is rockably mounted about the pin 25 and that, on change in the level of the liquid in the float chamber 11, it will move up or down about this pin as an axis. In order to provide a seal between the float 16 and the open end 12 of the float chamber 11, a flexible bellows 28 is provided around the parts which serve to rockably mount the float 16. As shown, the closed left-hand end of the flexible bellows 28 is positioned underneath the base member 23 and is secured to the cap 18 by the screw 24. The right-hand open end of the bellows 28 is secured, as by soldering, to the support member 27. In this manner the float 16 is rockably mounted with respect to the float chamber 11 about a fixed axis and the parts which serve to effect this mounting are entirely out of contact with the water or steam that may fill the float chamber 11. At the same time, complete flexibility in the movement of the float 16 about the pin 25 is assured.

The liquid level and pressure responsive device 10 finds its most useful application in connection with controlling the supply of fuel to the boiler so that, in the event of lowering of the water level below a predetermined point or increase of pressure beyond a predetermined amount, the fuel supply will be automatically shut off. Of course, it will be obvious that the float 16 could be arranged to control the supply of water to the boiler. However, that is not its intended function according to the present invention. With a view to taking advantage of the change in position of the float 16 in accordance with change in the liquid level, the arms 22 are extended a substantial distance past the pin 25 and have mounted therebetween a roller 31 which is carried by a pin 32. The roller 31 interfits in a recess 33 in a rocker member 34 that is rockably mounted on a pin 35 which extends between ears 36 that are carried by the housing of a circuit control device 37. The circuit control device 37 may be any suitable type of switch for opening and closing a circuit. A plunger 38 is provided and slidably mounted on the control device 37 for operating the control switch therein from one circuit controlling position to another. The rocker member 34 is arranged to engage the plunger 38, as indicated at 39, so that, when it is rocked in a clockwise direction, as viewed in Figure 1, the plunger 38 will be moved inwardly. As a result of this movement of the plunger 38 a switch may be operated from the closed to the open position. Arms 40 and 41, forming a part of the rocker member 34, serve as stops for limiting its movement in either direction by engaging the housing of the circuit control device 37.

It will be observed that the control device 37 is mounted on a suitable plate of insulation and it will be understood that suitable terminal connections extend therethrough to permit connection to an external circuit. A housing 43 serves to enclose the control device 37. A retaining channel-shaped ring 44 is secured to the inner periphery of the housing 43, as by soldering or welding, and it is provided with suitable apertures for receiving screws 45 which serve to hold not only the housing 43 but also the end plate 19 over the open end 12 of the float chamber 11. A gasket 46 is provided, as shown, to make a fluid-tight connection. The housing 43 is provided with a suitable aperture 47 through which the circuit conductors may be introduced for connection to the terminals of the control device 37. A suitable cover 48, secured to the housing 43 by the screws 49, is provided for completing the terminal box assembly around the face of the control device 37.

As shown in Figure 2 of the drawings, when the level of the liquid in the float chamber 11 falls, the float 16 will rotate through a small angle, as indicated at 52, about the pin 25 as an axis. By this movement the roller 31 is moved upwardly slightly in the recess 33 and the rocker member 34 is rotated in a clockwise direction, carrying with it the plunger 38 to open the contact members of the control device 37. This movement is limited by the engagement of the arm 40 with the housing of the control device 37. As a result of this operation of the plunger 38, it will be understood that a control circuit may be opened which will cause the shutting down of the burner that is employed in connection with the boiler. This may be effected in a variety of ways which are well understood by those skilled in the art.

In Figure 3 of the drawings I have illustrated the position to which the float 16 is rocked when the water level rises. As indicated, the float 16 will rock through a small angle as indicated at 53. In such a position the float 16 indicates that the water level may be too high. In order to prevent further increase in water level by the addition of more water to the boiler from an outside source, the control device 37 may be provided with another plunger 38' which will be depressed by rotation of the rocker member 34 in a counterclockwise direction resulting from the movement of the float 16 through the small angle 53. The plunger 38' may be arranged to control the supply of inlet water to the boiler by any suitable means. It will be understood, however, that the provision of the additional plunger 38' is optional and that, ordinarily, it will not be provided.

As indicated hereinbefore, it is desirable to operate the control device 37 in the event that the pressure in the float chamber 11 or the pressure in the boiler to which it is attached exceeds a predetermined point. It is for this purpose that the pressure responsive device, shown generally at 57, Figure 1, is provided. The pressure responsive device 57 may be threaded in a suitable threaded boss 58 that is formed integrally with the float chamber 11. If the pressure responsive device 57 is not employed, the aperture in the boss 58 may be closed by a suitable threaded plug, as will be readily understood.

The pressure responsive device comprises a pressure chamber that is formed by upper and lower shells 59 and 60. The shells 59 and 60 are secured together in fluid-tight relation by means of suitable rivets 61. The lower shell 60 is mounted on a nipple 62 the lower end of which is threaded, as shown, for threaded engagement with the boss 58. The upper end of the nipple 62 is grooved for receiving the lower apertured end of the lower shell 60 and, as shown at 63, a portion of the nipple 62 is turned over and soldered to provide a fluid-tight connection.

With a view to operating the control device 37, a stem 64 is provided and it extends out of the pressure chamber and into the float chamber 11. As shown, the lower end 65 of the stem 64 is spaced slightly away from the float 16. As will appear hereinafter, the stem 64 is arranged to engage the float 16 for moving the same downwardly. Since it is desirable to operate the control device 37 in the same manner either in response to a predetermined lowering of the liquid level or the occurrence of a predetermined pressure, the stem 64 may operate through the float 16 to cause it to move, in response to the occurrence of a predetermined pressure, in the same manner that it would move had the liquid level been lowered a corresponding extent. By this double use of the float 16 the entire construction of the liquid level and pressure responsive device 10 is considerably simplified. This construction also permits the application or removal of the pressure responsive device 57 itself without requiring any change in the operating mechanism for the control device 37 or the parts used in conjunction therewith, or any change in wiring.

The stem 64 is moved downwardly in response to the occurrence of a predetermined pressure in the float chamber 11 and in the pressure chamber which is in communication therewith. For this purpose the stem 64 has at its upper end a plate 66 that is supported by a yoke 67. The ends of the yoke 67 interfit, as indicated at 68, with opposite sides of the plate 66 to provide mechanical connection therebetween. Underneath the yoke 67 the closed end 70 of a flexible bellows 71 is secured. Connection may be provided therebetween as by soldering. The lower open end of the bellows 71 is secured, as by soldering, to a circular rib 72 that is formed integrally with a support member 73 located intermediate the ends of the pressure chamber formed by the shells 59 and 60. The support member 73 is provided with an integrally formed flange or ring 74 through which the rivets 61 project in holding the shells 59 and 60 in fluid-tight connection. Suitable apertures 75 are provided in the support member 73 to permit movement of the arms of the yoke 67 therethrough and to admit pressure to the top of the bellows 71.

In assembling the pressure responsive device the flexible bellows 71 may be sealed under atmospheric pressure or may be sealed under slight pressure. Due either to the inherent resiliency of the flexible bellows 71 or to the internal pressure therein, the yoke 67 is normally held in the position shown in Figure 1 of the drawings with the upwardly projecting circular portion 76 of the plate 66 in engagement with the downwardly extending ring-like rib 77 from the support member 73. In this manner the support member 73 serves as a stop for the upward movement of the stem 64 and the yoke 67. On application of pressure inside of the pressure chamber formed by the shells 59 and 60, the flexible bellows 71 is contracted and the stem 64 is moved downwardly.

With a view to controlling the pressure at which the stem 64 will be moved downwardly, a coiled compression spring 78 is provided around the stem 64 and its lower end projects into the nipple 62, as shown. The spring 78 is disposed between the under side of the plate 66 and the upper surface of a guide washer 79 that has suitable star openings for communication with the chamber 11 and which is carried by an adjusting sleeve 80. It will be observed that the adjusting sleeve 80 is threaded interiorly of the nipple 62 and that it is provided with notches 81 on opposite sides for receiving a suitable tool to adjust the sleeve 80 to the desired position.

On the occurrence of a predetermined pressure in the float chamber 11 and in the pressure chamber formed by the shells 59 and 60, the stem 64 will be moved downwardly, as is more clearly shown in Figure 4 of the drawings. The lower end 65 of the stem 64 engages the float 16 adjacent its right-hand end and moves the same downwardly through a small angle as indicated at 52' which corresponds to the angle 52, Figure 2, through which the float 16 moves when the water level drops a corresponding amount. The plunger 38 will be operated to effect the desired operation of the control device 37 for shutting down the burner of the boiler.

It will be understood that the pressure at which the stem 64 will be effective to move the float 16 downwardly is controlled by the position of the adjusting sleeve 80. If it is desired that the pressure responsive device 57 will be effective at a relatively low pressure, then the adjusting sleeve 80 is positioned in the lower end of the nipple 62. For higher pressures the sleeve 80 is rotated until it is moved upwardly in the nipple 62 the desired amount.

Since certain further changes may be made in the above construction, and different embodiments of the invention may be made without departing from the scope thereof, it is intended that all matter contained in the foregoing description or shown in the accompanying drawings shall be interpreted as illustrative, and not in a limiting sense.

I claim as my invention:

1. A liquid level responsive device comprising, in combination, a generally tubular liquid containing float chamber open at one end and substantially closed at the other end, said float chamber being adapted for mounting with its longitudinal axis substantially horizontal, a tubular float having a diameter small as compared to its length in said float chamber, support means carried by said float chamber and extending inwardly from the open end thereof, hinge means rockably mounting said float on said support means, a flexible bellows surrounding said hinge means and providing a sealed connection between said float and the open end of said float chamber, control means, a rocker arm for operating said control means, means carried by said float chamber rockably supporting said rocker arm, said rocker arm having a recess, and a roller carried by said hinge means and interfitting with said recess for moving said control means from one position to another in response to change in position of said float caused by change in level of the liquid in said float chamber.

2. A liquid level responsive device comprising, in combination, a generally tubular liquid containing float chamber open at one end and substantially closed at the other end, said float chamber being adapted for mounting with its longitudinal axis substantially horizontal, a tubular float having a diameter small as compared to its length in said float chamber, an end plate secured to and closing the open end of said float chamber, said end plate having an apertured inwardly extending portion, support means carried by said end plate, hinge means rockably mounting said float on said support means, a flexible bellows surrounding said hinge means and providing a sealed connection between said float and said apertured inwardly extending portion of said end plate, control means, a rocker arm for operating said control means, means carried by said float chamber rockably supporting said rocker arm, said rocker arm having a recess, and a roller carried by said hinge means and interfitting with said recess for moving said control means from one position to another in response to change in position of said float caused by change in level of the liquid in said float chamber.

3. A liquid level and pressure responsive device comprising, in combination, a float chamber for containing a liquid under pressure, a float in said chamber, support means carried by said chamber, hinge means rockably supporting said float on said support means, a flexible bellows surrounding said hinge means and providing a connection between said float and said float chamber, pressure responsive means carried by said float chamber, means operatively connected with said pressure responsive means and normally arranged and adapted to engage and move said float on the occurrence of predetermined pressure in said float chamber independently of the liquid level therein in the same direction that it is moved on lowering of the liquid level therein, and control means disposed to be operated in response to change in position of said float caused by change in level or pressure.

4. A liquid level and pressure responsive device comprising, in combination, a float chamber for containing a liquid under pressure, a float in said chamber, support means carried by said chamber, hinge means rockably supporting said float on said support means, a flexible bellows surrounding said hinge means and providing a connection between said float and said float chamber, pressure responsive means carried by said float chamber, means operatively connected with said pressure responsive means and normally arranged and adapted to engage and move said float on the occurrence of predetermined pressure in said float chamber independently of the liquid level therein in the same direction that it is moved on lowering of the liquid level therein, and control means carried by said float chamber externally thereof and mechanically connected to said float through said flexible bellows and operable from one position to another in response to change in position of said float caused by change in level or pressure.

5. A liquid level and pressure responsive device comprising, in combination, a float chamber for containing a liquid under pressure, a float in said chamber, support means carried by said chamber, hinge means rockably supporting said float on said support means, a flexible bellows surrounding said hinge means and providing a connection between said float and said float chamber, pressure responsive means carried by said float chamber and arranged and adapted to move said float on the occurrence of predetermined pressure in said float chamber in the same direction that it is moved on lowering of the liquid level therein, control means, a rocker arm for operating said control means, means carried by said float chamber rockably supporting said rocker arm, said rocker arm having a recess, and a roller carried by said hinge means and interfitting with said recess for moving said control means from one position to another in response to change in position of said float caused by change in level or pressure.

6. A liquid level and pressure responsive device comprising, in combination, a float chamber open at one end for containing a liquid under pressure, a float in said chamber, an end plate secured to and closing the open end of said float chamber, said end plate having an apertured inwardly extending portion, support means carried by said end plate, hinge means rockably mounting said float on said support means, a flexible bellows surrounding said hinge means and providing a sealed connection between said float and said apertured inwardly extending portion of said end plate, pressure responsive means carried by said float chamber, means operatively connected with said pressure responsive means and normally arranged and adapted to engage and move said float on the occurrence of predetermined pressure in said float chamber independently of the liquid level therein in the same direction that it is moved on lowering of the liquid level therein, and control means disposed to be operated in response to change in position of said float caused by change in level or pressure.

7. A liquid level and pressure responsive device comprising, in combination, a float chamber open at one end for containing a liquid under pressure, a float in said chamber, an end plate secured to and closing the open end of said float chamber, said end plate having an apertured inwardly extending portion, support means carried by said end plate, hinge means rockably mounting said float on said support means, a flexible bellows surrounding said hinge means and providing a sealed connection between said float and said apertured inwardly extending portion of said end plate, pressure responsive means carried by said float chamber and arranged and adapted to move said float on the occurrence of predetermined pressure in said float chamber in the same direction that it is moved on lowering of the liquid level therein, control means, a rocker arm for operating said control means, means carried by said float chamber rockably supporting said rocker arm, said rocker arm having a recess, and a roller carried by said hinge means and interfitting with said recess for moving said control means from one position to another in response to change in position of said float caused by change in level or pressure.

8. A liquid level and pressure responsive device comprising, in combination, a float chamber for containing a liquid under pressure, a float in said chamber, means for rockably mounting said float, a pressure chamber carried by and communicating with said float chamber, a flexible bellows in said pressure chamber, means operated by said bellows on change of length thereof in response to the occurrence of predetermined pressure in said pressure chamber and normally arranged and adapted to engage and move said float on the occurrence of predetermined pressure in said float chamber independently of the liquid level therein in the same direction that it is moved on lowering of the liquid level, and control means disposed to be operated in response to change in position of said float caused by change in level or pressure.

9. A liquid level and pressure responsive device comprising, in combination, a float chamber for containing a liquid under pressure, a float in said chamber, means for rockably mounting said float, a pressure chamber carried by and communicating with said float chamber, a flexible bellows in said pressure chamber, means rigidly supporting one end of said bellows in said pressure chamber leaving the other end free, a stem extending from said pressure chamber into said float chamber and disposed to engage said float, spring means biasing said stem away from said float, yoke means connecting said free end of said bellows and said stem for moving the latter against said spring means by contraction of said bellows on occurrence of predetermined pressure in said pressure chamber into engagement with said float whereby said float is moved in the same direction that it is moved on lowering of the liquid level, and control means disposed to be operated in response to change in position of said float caused by change in level or pressure.

10. A liquid level and pressure responsive device comprising, in combination, a float chamber for containing a liquid under pressure, a float in said chamber, means for rockably mounting said float, a pressure chamber carried by and communicating with said float chamber, a flexible bellows in said pressure chamber, means rigidly supporting one end of said bellows in said pressure chamber leaving the other end free, a stem extending from said pressure chamber into said float chamber and disposed to engage said float, spring means biasing said stem away from said float, yoke means connecting said free end of said bellows and said stem for moving the latter against said spring means by contraction of said bellows on occurrence of predetermined pressure in said pressure chamber into engagement with said float whereby said float is moved in the same direction that it is moved on lowering of the liquid level, means for adjusting said spring means to vary the pressure at which said float is moved in response to contraction of said bellows, and control means disposed to be operated in response to change in position of said float caused by change in level or pressure.

11. A pressure responsive device for attachment to a float controlled liquid level responsive device comprising, in combination, a pressure chamber adapted to be mounted on the float chamber of said liquid level responsive device, a stem extending out of said pressure chamber for engagement with said float, spring means biasing said stem inwardly of said pressure chamber, a support member intermediate the ends of said pressure chamber and constituting a stop for the inward movement of said stem, a flexible bellows rigidly fastened at one end to said support member leaving the other end free, and a yoke interconnecting the free end of said bellows with said stem whereby on occurrence of predetermined pressure in said pressure chamber said bellows is contracted and said stem is moved outwardly against said spring means.

12. A pressure responsive device for attachment to a float controlled liquid level responsive device comprising, in combination, a pressure chamber adapted to be mounted on the float chamber of said liquid level responsive device, a stem extending out of said pressure chamber for engagement with said float, spring means biasing said stem inwardly of said pressure chamber, a support member intermediate the ends of said pressure chamber and constituting a stop for the inward movement of said stem, a flexible bellows rigidly fastened at one end to said support member leaving the other end free, a yoke interconnecting the free end of said bellows with said stem whereby on occurrence of predetermined pressure in said pressure chamber said bellows is contracted and said stem is moved outwardly against said spring means, and adjusting means cooperating with said spring means for varying the pressure at which said stem is moved outwardly by contraction of said bellows.

OSCAR F. CARLSON.